US012583985B2

(12) United States Patent
Wu et al.

(10) Patent No.:  US 12,583,985 B2
(45) Date of Patent:  Mar. 24, 2026

(54) COATED FILM

(71) Applicant: Dow Global Technologies LLC, Midland, MI (US)

(72) Inventors: Jie Wu, Lake Jackson, TX (US); David L. Malotky, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 165 days.

(21) Appl. No.: 18/275,150

(22) PCT Filed: Dec. 9, 2021

(86) PCT No.: PCT/US2021/062636
§ 371 (c)(1),
(2) Date: Jul. 31, 2023

(87) PCT Pub. No.: WO2022/164517
PCT Pub. Date: Aug. 4, 2022

(65) Prior Publication Data
US 2024/0124668 A1    Apr. 18, 2024

Related U.S. Application Data

(60) Provisional application No. 63/143,120, filed on Jan. 29, 2021.

(51) Int. Cl.
*C08J 7/04*     (2020.01)
*C08J 3/12*     (2006.01)
*C08J 11/06*    (2006.01)

(52) U.S. Cl.
CPC . *C08J 7/04* (2013.01); *C08J 3/12* (2013.01); *C08J 11/06* (2013.01); *C08J 2300/30* (2013.01); *C08J 2323/02* (2013.01)

(58) Field of Classification Search
CPC ....... C08J 7/04; C08J 3/12; C08J 11/06; C08J 2300/30; C08J 2323/02
See application file for complete search history.

(56) References Cited

U.S. PATENT DOCUMENTS

| | | | |
|---|---|---|---|
| 8,129,032 B2 | 3/2012 | Dabadie et al. | |
| 2014/0255683 A1 * | 9/2014 | Amici ................ | C08L 23/0869 |
| | | | 428/327 |
| 2015/0184400 A1 * | 7/2015 | Baldwin ................ | B32B 9/046 |
| | | | 521/134 |
| 2018/0079880 A1 * | 3/2018 | Miyake ................... | B32B 27/32 |
| 2018/0363248 A1 | 12/2018 | Katzenstein et al. | |
| 2019/0338156 A1 | 11/2019 | Katzenstein | |

FOREIGN PATENT DOCUMENTS

| | | | | |
|---|---|---|---|---|
| EP | 2535368 A1 | 12/2012 | | |
| WO | 2009097175 A1 | 8/2009 | | |
| WO | WO-2018064123 A1 * | 4/2018 | ............. | B32B 27/08 |
| WO | WO-2020129962 A1 * | 6/2020 | ............... | C08K 5/29 |

OTHER PUBLICATIONS

Machine translation of JPWO 2020/129962 A1 (Year: 2020).*

* cited by examiner

*Primary Examiner* — Ramsey Zacharia
(74) *Attorney, Agent, or Firm* — Boyle Fredrickson S.C.

(57)    ABSTRACT

A coated film having improved optical properties and increased recyclability properties comprising a combination of: (a) at least one film layer of a recyclable polyolefin; and (b) at least one recyclable coating layer disposed on at least a portion of the surface of one side of the at least one film layer of the recyclable polyolefin such that the at least one coating layer provides the coated film with an increase gloss at 60°, a reduced haze, an increase in clarity; and a recyclability property.

14 Claims, No Drawings

COATED FILM

FIELD

The present invention is related to coated films; and more specifically, the present invention is related to recyclable coated films including: (a) a polyethylene base film substrate coated with (b) at least one polyolefin dispersion coating on one side of the polyethylene base film substrate. The coated films having beneficial recyclability properties can be used for manufacturing articles such as flexible packaging.

BACKGROUND

Many types of packages created to protect food, liquids, personal care and other products have been constructed with multilayer lamination structures, such as a two-ply PET//PE laminate and a three-ply PET//Nylon//PE laminate. Many packages include one or more transparent windows to exhibit the product contained by the package and/or attract the attention of potential consumers to that package. It is desirable for the window(s) of a package to be as transparent and clear as possible to allow a consumer to clearly identify the contents of the package through the window(s). The transparency and clarity of common package materials such as polyethylene (PE) can be improved (increased), for example, by modifying the properties of the package materials (e.g., PE) such as the crystallinity property of the material. However, an improvement in transparency and clarity of the package materials typically leads to a decrease in some mechanical properties of the package materials, such as stiffness.

In addition, known two-component polyurethane-based coating compositions have been used with PE films to improve the gloss and transparency properties of the PE films. However, the use of polyurethane-based coating compositions in package materials can cause (1) recyclability issues of PE due to gel formation in recycled materials; and (2) a significant decrease of mechanical properties of the formed films. For example, the transparency and clarity of a PE film which has been incorporated with a known recycled coated PE film can be deleteriously affected compared to the transparency and clarity of a neat (uncoated) PE film.

It would be desirable to provide new films and related materials for use in packages that have good optical properties such as high gloss and low haze; and that have easy recyclability properties.

U.S. Patent Application Publication No. US20160177073A1 and WO2000009594A1 disclose how to make polyethylene films by changing the compositions of polyethylene. WO 2005/026275, U.S. 2005/010075, WO 2005/085331, EP2247445 B1, EP 3037472 B1, and EP3155052B1 disclose polyolefin dispersion compositions and applications of such compositions. However, none of the above references disclose how to improve the optics, such as gloss and haze, of a polyethylene base film.

WO2018064123A1 discloses coated films and packages formed from such films. In one aspect, a coated film including: (a) a multilayer polymeric film having opposing first and second facial surfaces; and (b) a coating film layer on at least a portion of the first facial surface of the polymeric film. The polymeric film, component (a), is at least one of polyethylene, polypropylene, polyethylene terephthalate, or polyimide. The first facial surface of the film has a root mean square surface roughness of at least 80 nm when measured using image analysis with an atomic force microscope and the second facial surface of the film has a root mean square surface roughness of less than (<) 80 nm when measured using image analysis with an atomic force microscope. The coating film layer, component (b), on at least a portion of the first facial surface is a polyurethane coating, and the coated film layer has a Zebedee clarity of at least 2 percent (%) When measured according to ASTM D1746/15 in the coated portion of the first facial surface. WO2018064123A1 also discloses how to make high gloss and high transparent polyethylene films with a polyurethane top coating. However, WO2018064123A1 does not teach the use of an aqueous olefin copolymer dispersion as a gloss enhancing coating.

SUMMARY

The present invention is directed to recyclable coated films comprising (a) a polyethylene base film substrate coated with (b) at least one polyolefin dispersion coating on one side of the polyethylene base film substrate. In addition to mechanical recyclability properties, the coated films of the present invention advantageously exhibit high gloss and high clarity (i.e., low haze) properties.

In some embodiments, the present invention includes a process for producing the above coated films.

In some embodiments, the present invention includes a first article made from the above coated film such as pellets, a monolayer film, a multilayer film, a monolayer laminate, a multilayer laminate, a packaging material, a molded product, and the like.

In some embodiments, the present invention includes a subsequent second article made from the recycled material originating from any one of the above first articles.

Advantageously, the first article made incorporating the high gloss and low haze coated film can be subjected to a recycling process in accordance with current recyclability guidelines for the packaging industry. For example, utilizing the coating dispersions of the present invention to form a coated polymer film structure comprising a recyclable polyethylene film (such as an all-polyethylene (PE) high density polyethylene (HDPE) film) with a recyclable coating layer provides a beneficial film structure that can be reprocessed to make a new second article with properties and performance that are substantially the same as the first article.

DETAILED DESCRIPTION

"Recyclable" or "recyclability" herein, with reference to a film article having a waterborne olefin-based coating, means mechanical recyclable or recyclability; and means the film article with a waterborne olefin-based coating is mechanically re-processable to generate another subsequent recycled article having a desirable performance and desirable properties.

"High gloss", with reference to a film substrate, herein means having gloss level of over 86 units.

"Low haze" "high clarity", with reference to a film substrate, herein means a coated film substrate has a total haze of at least 30% lower than a non-coated film substrate.

In one broad embodiment, the present invention includes a recyclable coated film structure for producing packaging materials that can be recycled at the storefront. The recyclable coated film includes the combination of at least one heat-sealable, recyclable polyolefin film layer substrate coated with a coating layer; the coating layer being disposed on at least a portion of the surface of one side of the polyolefin film layer.

According to one or more embodiments of the present invention, the polyolefin film layer, component (a), includes, for example, a polyolefin film comprising an ethylene-based polymer; and the coating layer, component (b), includes, for example, a coating layer having improved optical properties such as high gloss, low haze, and high clarity; and at the same time having a sufficient recyclability property. Also, the recyclable coating layer is beneficially compatible with the polyolefin layer.

Generally, the recyclable polymer film layer has an outer (or external or top) surface and an inner (or internal or bottom) surface; and the coating layer has an outer (or external or top) surface and an inner (or internal or bottom) surface. At least a portion of the internal surface of the coating layer is in contact with at least a portion of the external surface of the polyolefin film layer. In a preferred embodiment, the outer surface of the coating layer forms the outer surface of the overall coated film structure (i.e., polyolefin layer plus coating layer). For example, in a general embodiment the coated film of the present invention includes (a) at least one polyolefin film layer such as a polyethylene (PE) film; and (b) a high gloss and low haze coating layer bonded to the polyolefin film. One or more other optional film layer substrates can be added to the above film structure to produce a multi-layer film structure, if desired.

In one or more embodiments, the polyolefin film web or layer, component (a), used for making the coated film structure of the present invention is made from an olefin-based polymer. The term, "olefin-based polymer," "olefinic polymer," and "polyolefin," as used herein, refer to a polymer that comprises, in polymerized form, a majority amount of olefin monomer, for example, ethylene or propylene (based on the weight of the polymer) and, optionally, may comprise one or more comonomers. The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The polyolefin film layer may comprise a film layer made from one polyolefin polymer or a film layer made from a blend of two or more different polyolefin polymers.

In one or more preferred embodiments, the polyolefin layer may comprise an ethylene-based polymer. As described herein, "polyethylene" or an "ethylene-based polymer" shall mean polymers comprising greater than (>) 50% by mole of units derived from ethylene monomer. This includes ethylene-based homopolymers or copolymers as aforementioned. Common forms of polyethylene known in the art include, but are not limited to, low density polyethylene (LDPE); linear low density polyethylene (LLDPE); ultra low density polyethylene (ULDPE); very low density polyethylene (VLDPE); single-site catalyzed linear low density polyethylene, including both linear and substantially linear low density resins (m-LLDPE); medium density polyethylene (MDPE); and high density polyethylene (HDPE). For example, the polyolefin layer, can include one or more polyolefin layers such as HDPE, LDPE, LLDPE, MDO PE, BOPE, and mixtures thereof.

Additionally, as described herein, the term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 milliPascals [MPa]) with the use of freeradical initiators, such as peroxides (see, for example, U.S. Pat. No. 4,599,392). LDPE resins typically have a density in the range of 0.916 g/cm to 0.940 g/cm.

The term "LLDPE", as described herein, may include resins made using ZieglerNatta catalyst systems as well as resin made using single-site catalysts, including, but not limited to, bis-metallocene catalysts (sometimes referred to as "m-LLDPE"), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923, and 5,733,155; the homogeneously branched ethylene polymers such as those described in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or U.S. Pat. No. 5,854,045). The LLDPE resins can be made via gas-phase, solution-phase or slurry polymerization or any combination thereof, using any type of reactor or reactor configuration known in the art. The LLDPE resins can be made via gas-phase, solution-phase, or slurry polymerization or any combination thereof, using any type of reactor or reactor configuration known in the art.

Additionally, as described herein, the term "HDPE" refers to polyethylenes having densities of about 0.940 g/cm or greater, which are generally prepared with Ziegler-Natta catalysts, chrome catalysts or even metallocene catalysts. In one or more embodiments, the polyolefin film layer may be a multilayer film which includes an outer layer comprising an ethylene-based polymer.

In some embodiment, the polyethylene polymer suitable for use in the present invention may be commercially available such as polyethylene polymers under the tradenames AGILITY™ (e.g., AGILITY 1000, AGILITY 1001, and AGILITY 1021), INNATE™ ST 50, ELITE™ 5940, ELITE™ 5960, DOW™ LDPE 6211, and DOW™ LDPE 7511, all of which are available from The Dow Chemical Company.

In one or more embodiments, the polyolefin film web or layer, component (a), used for making the coated film structure of the present invention can include a single layer (monolayer) made of one or more polyolefins or olefinic polymers; or the film structure can include a multilayer structure made of one or more polyolefin layers.

In other embodiments, the polyolefin film of the present invention may be a multilayer film which contains more than one layer. As described herein, a "multilayer film" means any film having more than one layer. For example, the multilayer film may have two, three, four, five or more layers. A multilayer film may be described as having the layers designated with letters to assist in describing the film. For example, a two-layer film having two different polyolefin film layers can be designated as A/B; and a three-layer film having a core layer B, and two external layers A and C may be designated as A/B/C. Likewise, a structure having two core layers B and C and two external layers A and D would be designated A/B/C/D. In some embodiments, the polyolefin films may be coextruded films with an odd number of layers from 3 to 35, such as from 3 to 11 or from 3 to 7. For example, in some embodiments, the polyolefin film layer may be a three-layer multilayer film comprised of three layers of polyethylene.

In one preferred embodiment, the polyolefin film layer can include oriented single or multilayer PE films made using either machine direction or biaxial orientation processes which is bonded to a second layer.

In another preferred embodiment, the polyolefin film layer can be a multilayer film comprised one or more layers of HDPE, LLDPE, and LDPE.

In still another preferred embodiment, the polyolefin film layer can be a PP film or a biaxially oriented PP (BOPP) film layer.

The thickness of the polyolefin film layer used to form the polyolefin polymer film layer of the present invention can be, for example, from 12 microns (μm) to 125 μm in one embodiment, from 20 μm to 100 μm in another embodiment and from 25 μm to 50 μm in still another embodiment.

In one or more embodiments, the polyolefin film layer may have a thickness of less than or equal to (≤) 1 mm, such as ≤900 μm, ≤800 μm, ≤700 μm, ≤600 μm, ≤500 μm, ≤400 μm, ≤300 μm, or even ≤200 μm. The polyolefin film layer may have a thickness of greater than or equal to (≥) 1 μm, ≥5 μm, ≥10 μm, ≥20 μm, ≥30 μm, ≥40 μm, or even ≥50 μm. As is understood by those skilled in the art, in multilayer films, the thicknesses of the different layers can be the same or different; and layer thicknesses may be selected by techniques known to those having skill based on the disclosure herein.

The high gloss and low haze coating layer bonded to the polyolefin film forming a coated film structure, component (b), is advantageously formed from a coating dispersion composition that has a recyclability property. The coating dispersion composition imparts its recyclability property to the coated film structure containing the recyclable coating layer made with the coating dispersion composition. In turn, recyclable coating layer imparts to an article, for example a packaging article, manufactured from the coated film, with an acceptable recyclability property when the packaging article is made from the recyclable film structure.

In one broad embodiment, the coating dispersion composition useful in the present invention includes, for example, a waterborne coating composition comprising (A) at least one polymeric dispersant such as an ethylene acrylic acid copolymer, an ethylene methacrylic acid copolymer, and mixtures thereof; and (B) at least one neutralizing agent.

According to a number of embodiments of the present invention, the aqueous dispersion can comprise a neutralizing agent, e.g., such that the aqueous dispersion has a pH in a range of from 8 to 11. All individual values and subranges from 8 to 11 are included herein and disclosed herein. For example, the aqueous dispersion can have a pH from a lower limit of 8, 8.1, 8.2, or 8.3 to an upper limit of 11, 10.9, 10.8, or 10.7. For example, the aqueous dispersion can have a pH from 8 to 11, 8.1 to 10.9, 8.2 to 10.8, or 8.3 to 10.7.

In one general embodiment, the neutralizing agent compound useful in the present invention has a boiling point of less than 140° C. Examples of the neutralizing agent useful in the present invention include, but are not limited to, hydroxides, carbonates, hydrogen carbonates, amines, and combinations thereof. Examples of hydroxides useful in the present invention include, but are not limited to, ammonium hydroxide, potassium hydroxide, lithium hydroxide, sodium hydroxide, and combinations thereof. Examples of carbonates useful in the present invention include, but are not limited to, sodium carbonate, sodium bicarbonate, potassium carbonate, calcium carbonate, and combinations thereof. Examples of amines useful in the present invention include, but are not limited to, monoethanolamine, diethanolamine, triethanolamine, ammonia, monomethylamine, dimethylamine, trimethylamine, 2-amino-2-methyl-1-propanol, triisopropanolamine, diisopropanolamine, N,N-dimethylethanolamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris (hydroxymethyl)-aminomethane, N,N,N'N'-tetrakis(2-hydroxylpropyl)ethylenediamine, 1,2-diaminopropane, 2-amino-2-hydroxymethyl-1,3-propanediol, N,N'-ethylenebis[bis(2-hydroxypropyl)amine]toluene-p-sulphonate, or cyclic amines such as morpholine, piperazine, piperidine, and combinations thereof.

Other ingredients such as waxes, acid functional waxes, and mixtures thereof may also be optionally present in the dispersion composition. And base resins are optionally used in the present invention such as a polyolefin with a MI of >1 in one general embodiment, and >20 MI in another embodiment; and with a melting temperature of <120° C. in one general embodiment, and <100° C. in another embodiment. Examples of the base resin useful in the present invention include, but are not limited to, ENGAGE 8401, ENGAGE 8407, ELVAX 220W, and ELVAX 150W (available from The Dow Chemical Company); and mixtures thereof.

The MI of the dispersant is generally >60 in one embodiment and >250 in another embodiment; and the MI of the dispersant is generally <1,500 in one embodiment and <600 in another embodiment. The acid value of the dispersant is generally >80 in one embodiment and >120 in another embodiment; and the acid value of the dispersant is generally <300. The melting temperature (Tm) of the base resin is generally <120° C. in one embodiment and <100° C. in another embodiment; and the Tm of the base resin is generally >40° C. The MI of the base resin is generally >1 in one embodiment and >20 in another embodiment; and the MI of the base resin is generally <1,200.

In some embodiments, examples of acid functional waxes include, but are not limited to, a maleic anhydride modified wax such as Licocene 431 (available from Clariant); an acid functional olefin such as Unicid 350 (available from Nucrea Solutions); a fatty acid such as oleic acid; and combinations thereof. The acid in the dispersion formulation is neutralized by a base such as dimethylethanolamine or ammonia, which enables the formation of the aqueous dispersion through the saponification of acid present in the formulation.

The coating dispersion composition of the present invention is useful for making films that subsequently are used to produce a packaging product such as for packaging fresh produce, frozen produce, and general snacks.

The coating weight of the coating layer applied to the polyolefin layer can be in the range of from 0.8 grams per square meter (g/m² or gsm) up to 5 gsm in one general embodiment, from 1 gsm to 3.5 gsm in another embodiment, and from 1.2 gsm to 3 gsm in still another embodiment. A weight that is lower than 0.8 gsm can cause appearance issues and does not provide improved gloss and reduced haze. Any coating layer weight greater than 5 gsm can be difficult to dry, and may increase haze.

The particles present in the coating composition can be at a particle size of less than 1 μm in one general embodiment.

According to one or more embodiments, the coating layer of the coated film has desirable optical properties such as a gloss finish, a reduced haze, and a high transparency/clarity.

As is described herein, these optical properties are achieved by the presently disclosed processing steps during the fabrication of the coated film.

For example, in one or more embodiments, the coated film has a gloss of at least 85 units at 60°. As described herein, gloss is measured by utilizing the ASTM D2457 standard. In additional embodiments, the gloss at 60° may be from 85 units to 105 units in one embodiment, from 105 units to 120 units in another embodiment, and from 120 units to 135 units in still another embodiment.

As should be apparent from the present disclosure, numerous advantages may be present in the presently described coated films and methods for the making thereof. In particular, a film manufacturer may provide a film with a similar gloss finish to conventional films which utilizes fewer layers. Additionally, the same materials (i.e., polyolefin film and coating layer) may be utilized to from films with varying optical finishes.

In some embodiments, the coating layer beneficially provides a film substrate with low or reduced haze properties. For example, the haze of the coated film can be ≤40% in one general embodiment; ≤30% in another embodiment; and ≤20% in still another embodiment.

The thickness of the coating layer used to coat the polyolefin layer and to form the recyclable coated film structure of the present invention can be, for example, from 1 µm to µm in one general embodiment. Any coating layer thickness that is higher than 5 µm can be difficult to dry, and may increase haze.

Once the coating layer is formed on the polyolefin layer a coated film is produced. And as aforementioned, the coating layer will provide the coated film with beneficial properties such as high gloss, low haze and high clarity.

In other embodiments, the coated film exhibits a sufficient recyclability property that makes the coated film advantageous for recycling a first article made from the coated film and subsequently making a different second article from the recycled material of the first article such that second article from the recycled material maintains the same properties compared to the first article or the second article at least does not exhibit a change in performance of no more than 50% compared to the first article.

The coated film structure of the present invention can include other optional substrate layers, component (c), in addition to the above component layers (a) and (b). For example, in some embodiments, the polyolefin film structure may include a printed layer on the top surface of the polyolefin layer, where the printed layer may be in contact with the coating layer; and thus, forming a multilayer film structure wherein the printed layer is disposed in between the polyolefin layer and the coating layer. In such embodiments, the coating composition may be applied directly onto the printed layer. The printed layer may be an ink layer to show product details and other packaging information in various colors. The printed layer may be ≤15 µm in one embodiment, ≤10 µm in another embodiment, ≤5 µm in still another embodiment, and even ≤2.5 µm in yet another embodiment.

If desired, optional layers having a specific function such a sealant layer, a barrier layer, a tie layer, and the like, can be added to the coated film structure.

In one broad embodiment, the recyclable coated film of the present invention is produced by applying the coating dispersion composition described above onto the surface of one side of the polyolefin film substrate to form a coating layer on the surface of the polyolefin film substrate. According to one or more embodiments, the coated film of the present invention may be made by a general process comprising the steps of applying the uncured coating dispersion composition on at least a portion of the outer surface of the polyolefin film layer; and curing the uncured coating dispersion composition to form a coating layer on the polyolefin layer resulting in the coated film structure of the present invention. The application of the uncured coating composition may be such that the outer surface of the polyolefin layer is in contact with the inner surface of the coating layer.

For example, in one general embodiment, the process for producing the recyclable film structure includes the steps of: (I) providing (a) a polyolefin film substrate; and (b) a coating dispersion composition; (II) applying the coating dispersion composition to at least a portion of the surface of the polyolefin substrate to form a coating layer; and (III) curing the coating dispersion composition to form a cured coating layer on the top surface of the polyolefin substrate of step (II) to form a coated film. As described herein, "applying" a coating dispersion composition to a polyolefin layer substrate may include bringing the coating composition into contact with the polyolefin layer by any conventional means known in the art of applying coating compositions or formulations to a film substrate. For example, the coating composition can be applied using conventional film forming equipment and processes such as gravure printing, flexographic printing, offset printing, Meyer rod drawdown, and the like.

The curing of the coating dispersion composition is carried out at a temperature which is lower than the melting temperature of the polyolefin film to avoid stretch and distortion of the film. Generally, the coating is cured at a curing temperature of from 15° C. to 45° C. in one embodiment, and from 20° C. to 35° C. in another embodiment.

In one or more embodiments, the application of the uncured coating composition may be performed by a lamination process on a conventional lamination machine. For example, according to one or more embodiments, the uncured coating composition may be applied onto the polyolefin film layer as the polyolefin film layer is translated in a machine direction. That is, the polyolefin film layer may be conveyed in a machine direction while the uncured coating composition is applied. As described herein, the machine direction refers to the direction in which the film flows onto or into a processing machine, such as the laminator. The uncured coating composition may be deposited onto the polyolefin film layer with either smooth rolls or gravure rolls, which may be selected, at least in part, by the viscosity of the uncured coating composition. The polyolefin film layer may begin in a rolled form, to be unwound and conveyed in a machine direction where the uncured coating composition is applied to the polyolefin layer, and then the polyolefin layer is re-wound into a roll.

According to embodiments disclosed herein, following the application of the uncured coating composition, the uncured coating composition may be cured to form the coating layer comprising the cured coating composition layer positioned on the surface of the polyolefin layer. The curing may be "passive," meaning that the curing takes place by allowing the uncured coating composition to rest at ambient conditions for a period of time. Alternatively, the curing may be facilitated by exposure to increased temperatures, radiation, or other mechanisms that may cause curing to take place in the coating composition. In some embodiments, the curing may take place while the polyolefin film layer and the uncured coating composition are in a roll following lamination. Following a period of time, the uncured coating composition solidifies and forms a roll of film comprising the coated film with the coating layer.

Because the coated films of the present invention exhibit good recyclability improved optical properties, the coated film of the present invention, prior to recycling, can be used, for example, in packaging applications for manufacturing various packaging materials and products. For example, the coated film can be used for bulk packaging of food grains/pulses, packaging of seeds, packaging of lentils and cereals, packaging of fertilizer, packaging of oilseed, packaging of sugar, packaging of salt, packaging of pharmaceuticals, packaging of other food stuff, and personal care items such as bath salts, detergent pods and the like. The coated film may also be used as a wrapper for baby wipes, feminine hygiene products, cereal bars, protein bars, cheese and confectionary products. Also, other advantageous features and applications for the recyclable film when used for packaging articles include, for example, resistance to severe weathering conditions, high tensile strength, robust drop test resistance, excellent optical appearance, and resistance to spills.

One of the advantages of the present invention is that a used (post-consumer) virgin (or first) article made from the coated film of the present invention can be processed through a recycling process. After recycling, the recycled material from the previous virgin first article can be used to make a subsequent recycled film, and in turn, the subsequent recycled film can be used to make a recycled (or second) article. The resultant subsequent recycled film can advantageously be used to manufacture a subsequent recycled second article which has properties and performs very close to the previous virgin first article. For example, a new monolayer recycled film structure made with recycled material sourced from the previous virgin first article can have properties that exhibits <50% change in performance relative to a control virgin film that is reprocessed the same without any recycled material. In some embodiments, the new monolayer film structure can have properties that exhibits a change in performance in the range of from 0% to <50% in one embodiment, from 0.01% to <40% in another embodiment, and from 0.1% to <30% in still another embodiment.

In some embodiments, the new monolayer film structure can have properties that exhibits a change in performance at <50% in one embodiment, <25% in another embodiment, and <10% in still another embodiment. In some embodiments, the new monolayer film structure can have properties that exhibits a change in performance in the range of from 0% to <50% in one embodiment, 0.01% to <50% in another embodiment, and from 0.1% to <50% in still another embodiment. In some embodiments, the new monolayer film structure can have properties that exhibits a change in performance in the range of from 0% to <25% in one embodiment, 0.01% to <25% in another embodiment, and from 0.1% to <25% in still another embodiment. In some embodiments, the new monolayer film structure can have properties that exhibits a change in performance in the range of from 0% to <10% in one embodiment, 0.01% to <10% in another embodiment, and from 0.1% to <10% in still another embodiment. The recycled film structure and the recycled film structure's recyclability performance meet the recyclability guidelines of The Association of Plastic Recyclers.

Examples

The following Inventive Examples (Inv. Ex.) and Comparative Examples (Comp. Ex.) (collectively, "the Examples") are presented herein to further illustrate the features of the present invention but are not intended to be construed, either explicitly or by implication, as limiting the scope of the claims. The Inventive Examples of the present invention are identified by Arabic numerals and the Comparative Examples are represented by letters of the alphabet. The following experiments analyze the performance of embodiments of compositions described herein. Unless otherwise stated all parts and percentages are by weight on a total weight basis.

Various materials used in the Examples which follow are described in Tables I-III.

TABLE I

| Raw Materials | | |
| --- | --- | --- |
| Material | Brief Description | Supplier |
| ENGAGE ™ 8407 (EG8407) | An ethylene octene polyolefin elastomer with a MI = 30 and a density = 0.87. | Dow |
| PRIMACOR ™ 5980 | A thermoplastic ethylene acrylic acid copolymer with 20.4% acrylic acid and a MI = 300. | SK Global |
| ENGAGE ™ 8401 (EG8401) | An ethylene octene polyolefin elastomer with a MI = 30 and a density = 0.885. | Dow |
| UNICID ™ 350 | A long chain (C22-C26) linear primary carboxylic acid having a melting point of 92. | Nucrea Solutions |
| NUCREL ™ 2050H | A copolymer of ethylene and methacrylic acid (MAA) with 20% MAA and a MI = 500. | Dow |
| INNATE ™ ST 50 | A polyethylene resin with a density of 0.918 g/cm$^3$ | Dow |
| ELITE ™ 5940ST | A polyethylene resin with a density of 0.941 g/cm$^3$ | Dow |
| ELITE ™ 5960G1 | A polyethylene resin with a density of 0.962 g/cm$^3$ | Dow |
| AFFINITY ™ PL1880G | A polyethylene resin with a density of 0.902 g/cm$^3$ | Dow |

General Procedure for Preparing Component A of Polyurethane Coating

The ingredients and their respective amounts described in Table II were used to prepare Component A of the polyurethane coating of the present invention.

TABLE II

Composition of Component A of Polyurethane Coating

| Ingredient | Brief Description | Amount (wt %) |
|---|---|---|
| Ethyl acetate | Solvent (available from UNIVAR, Inc.) | 24.049 |
| Trimethylolpropane | Trimethylolpropane, MW = 134; functionality = 3 (available from Lanxess Corp) | 6.471 |
| Methylene diphenyl diisocyanate (MDI) | ISONATE ™ 125M (available from Dow Chemical Company) | 48.62 |
| Wax Ester | Synaceti 125 (available from Werner G. Smith, Inc.) | 1.191 |
| Corn oil | Fatty triglyceride, refined corn oil (available from Cargill Inc.) | 1.191 |
| Cyclohexane | Cyclohexane (available from UNIVAR, Inc.) | 18.423 |
| Benzoyl chloride | Benzoyl chloride (available from Aldrich Chemical Co.) | 0.055 |

To prepare Component A using the ingredients described in Table II, the wax ester and the trimethylolpropane were loaded to a reactor followed by ethyl acetate. The MDI was vacuum loaded to the reactor followed by the remainder of the ethyl acetate as a rinse. The resultant batch was held at 70° C. for 3 hours (hr). The batch was then cooled to 55° C. The corn oil was vacuum loaded to the reactor. The cyclohexane was then added to the reactor, and the contents were held at 45° C. and stirred 45 minutes (min) until the contents became clear. The benzoyl chloride was then vacuum loaded to the reactor, and the contents were stirred for 15 min. The resulting Reactant Component A was then packaged for later use.

General Procedure for Preparing Component B of Polyurethane Coating

The ingredients and their respective amounts described in Table III were used to prepare Component B of the polyurethane coating of the present invention.

TABLE III

Composition of Component B of Polyurethane Coating

| Ingredient | Brief Description | Amount (wt %) |
|---|---|---|
| Ethyl acetate | Solvent (available from UNIVAR, Inc.) | 34.196 |
| Triisopropylanolamine (TIPA) | Polyol; MW = 191; functionality: 3 (available from The Dow Chemical Company) | 17.644 |
| Monomeric toluene diisocyanate (TDI) | Mondur TD-80 Grade B (available from Covestro) | 15.505 |
| Voranol ™ 220-260 | Polyether diol (nominal molecular weight of 425), functionality = 2, OHN = 260 (available from The Dow Chemical Company) | 12.054 |
| Voranol ™ 220-110N | Polyether polyol, MW = 1,000; Functionality: 2; OHN = 110 (available from The Dow Chemical Company) | 18.633 |
| SAG-47 | Anti-foam (available from Momentive Performance Materials) | 0.004 |
| CAB-381-0.5 | Cellulose acetate butyrate, anti-block agent (available from Eastman Chemical Company) | 1.121 |
| CAB-551-0.01 | Cellulose acetate butyrate, anti-block agent (available from Eastman Chemical Company) | 0.280 |
| Modaflow | Wetting, leveling agent, acrylic polymer (available from Allnex) | 0.561 |

To prepare Reactant Component B, TIPA was first melted. Voranol 220-260 was vacuum loaded into a reactor. The melted TIPA was vacuum loaded into the reactor, followed by VORANOL 220-110N. The vacuum lines were rinsed with ethyl acetate and the contents of the reactor were stirred at 75 revolutions per minute (rpm). Ethyl acetate was vacuum loaded into the reactor. The contents of the reactor were cooled via a cooling jacket. After cooling the reactor contents, the TDI was loaded to the reactor; and the vacuum lines were rinsed with ethyl acetate. Because of the exothermic nature of the reaction, the contents of the reactor were cooled to a temperature of 75° C. The temperature in the reactor was held at 75° C. under agitation for 4 hr. The contents of the reactor were then cooled to 60° C. After cooling the reactor to 60° C., a mixture of antifoam, cellulose acetate butyrate, Modaflow, and the remaining ethyl acetate were vacuum loaded into the reactor. The contents of the reactor were then stirred for 60 min at 60° C. The reactor was then cooled to 50° C. The resultant Reactant Composition B was packaged for later use.

Inventive Examples 1-5: Polyolefin Dispersions

General Procedure for Preparing Polyolefin Dispersions

The aqueous dispersions of Inv. Ex. 1 to 5 having the compositions as described in Table IV, below, were prepared using: (1) the raw materials described in Table I, above; (2) the conditions as described in Table IV; and (3) the following general procedure:

Components 1 to 3 described in Table IV were fed into a 25 mm diameter twin screw extruder using a controlled rate feeder; using the feed rate in "g/min" as indicated in Table IV. Components 1 to 3 were forwarded through the extruder and melted to form a liquid melt material.

The extruder temperature profile was ramped up to the temperature described in Table IV. Water and volatile base and/or neutralizing agent, which in all Inv. Ex. 1 to 5 was either dimethylethanolamine (DMEA) or 28 wt % aqueous ammonia ($NH_4OH$); were mixed together and fed to the extruder at the rates described in Table IV for neutralization at an initial water introduction site. Then, dilution water was fed into the extruder at the rates described in Table IV. The extruder temperature profile was cooled back down to a temperature below 100° C. near the end of the extruder. The extruder speed used in rpm is also described in Table II. At the extruder outlet, a backpressure regulator was used to adjust the pressure inside the extruder barrel to a pressure adapted to reduce steam formation (generally, for example, the pressure was from 2 MPa to 4 MPa).

Each aqueous dispersion, exiting from the extruder, was filtered through a 200 micrometer (μm) filter. The resultant filtered aqueous dispersions had a solids content measured in weight percent (wt %).

TABLE IV

Polyolefin Dispersions

| Example No. | Dispersion Designation | Component 1 (g/min) | Component 2 (g/min) | Component 3 (g/min) | Initial Aqueous (ml/min) | Base (ml/min) | Dilution Water (ml/min) | Extruder Temp. (° C.) | Extruder Speed (rpm) |
|---|---|---|---|---|---|---|---|---|---|
| Inv. Ex. 1 | POD1 | ENGAGE 8407 (64.3) | PRIMACOR 5980 (11.3) | n/a | (15.1) | DMEA (3.9) | (75.0) | 130 | 470 |
| Inv. Ex. 2 | POD2 | ENGAGE 8401 (113.4) | PRIMACOR 5980 (7.6) | UNICID 350 (5.0) | (14.4) | DMEA (4.5) | (165) | 140 | 600 |
| Inv. Ex. 3 | POD3 | Nucrel 2050H (50) | n/a | n/a | (28.0) | $NH_4OH$ (7.8) | (185) | 120 | 500 |
| Inv. Ex. 4 | POD4 | PRIMACOR 5980 (40) | n/a | n/a | (21.2) | $NH_4OH$ (8.5) | (120) | 120 | 400 |
| Inv. Ex. 5 | POD5 | PRIMACOR 5980 (56.7) | n/a | n/a | (35.0) | $NH_4OH$ (12.1) | (183) | 120 | 400 |

Inventive Examples 6-19 and Comparative Examples A-F: Coated Films

The Film Structures

The film structures to be coated with the dispersions of Inv. Ex. 1-5 described in Table IV above are described in Table V.

TABLE V

Film Structures

| Substrate | Density (treated layer) (g/cm³) | Layer Structure | Layer Components | Layer Portions | Overall Film Thickness (μm) |
|---|---|---|---|---|---|
| PE1 | 0.918 | A/B | A: INNATE ST 50<br>B: AFFINITY PL1880G | A: 80<br>B: 20 | 50 |
| PE2 | 0.941 | A/B | A: ELITE 5940ST<br>B: AFFINITY PL1880G | A: 80<br>B: 20 | 50 |
| PE3 | 0.962 | A/B | A: ELITE 5960G1<br>B: AFFINITY PL1880G | A: 80<br>B: 20 | 50 |

General Procedure for Preparing Coated PE Substrate Samples

Coated PE substrate samples for testing were prepared by hand-coating the wet polyolefin coating dispersions of Inv. Ex. 1-5 (herein designated POD1-POD5) described in Table IV above. POD1 to POD5 were hand-coated onto the surface of one side of the PE substates (herein designated PE1, PE2, and PE3) described in Table V above. For example, a coated film polyethylene film substrate sample is prepared by hand-coating a polyolefin dispersion such as POD1 onto a polyethylene substrate such as PE1 (a two-layer film structure of INNATE ST 50 and AFFINITY PL1880G having a thickness of 50 µm. The wet coating layer is applied to the PE substrate samples by hand-coating using K control coater #2 drawdown bar. The resultant coated substrate samples were then dried in a 70° C. convection oven for 2 minutes (min) to remove water present in the dispersion. The coating weight for the coating layers is about 2.9 g/m$^2$. The coated PE film substrate samples of Inv. Ex. 6-19 and Comp. Ex. B, D, and F are described in Tables VI-VIII. Tables VI-VIII also describe neat (non-coated) polyethylene films of Comp. Ex. A, C and E.

General Procedures for Testing Coated PE Substrate Samples

The coated PE film substrate samples of Inv. Ex. 6-19 and Comp. Ex. B, D and F, prepared as described above, were tested for their optical properties including gloss and haze. The cured coated substrate samples were tested for film gloss at 60° based on ASTM D2457. The cured coated substrate samples were tested for total film haze based on ASTM D1003. The test results of the coated PE film substrate samples are described in Tables VI-VIII. From the data in Tables VI-VIII, it can be determined that the coated polyethylene film samples of the present invention demonstrated high gloss and low haze compared to the comparative neat (i.e., non-coated) polyethylene film samples.

TABLE VI

| Example No. | Material Description | Gloss at 60° | Haze (total) |
|---|---|---|---|
| Comp. Ex. A | Neat PE 1 | 99.18 | 12.5 |
| Comp. Ex. B | Polyurethane coated PE1 | 130.8 | 7.67 |
| Inv. Ex. 6 | POD2 coated PE1 | 114.8 | 8.35 |
| Inv. Ex. 7 | POD3 coated PE1 | 130 | 6.46 |
| Inv. Ex. 8 | POD4 coated PE 1 | 126 | 7.17 |
| Inv. Ex. 9 | POD5 coated PE 1 | 129.2 | 6.6 |

TABLE VII

| Example No. | Material Description | Gloss at 60° | Haze (total) |
|---|---|---|---|
| Comp. Ex. C | Neat PE 2 | 78.92 | 20.56 |
| Comp. Ex. D | Polyurethane coated PE 2 | 133.2 | 9.29 |
| Inv. Ex. 10 | POD1 coated PE 2 | 95.98 | 10.68 |
| Inv. Ex. 11 | POD2 coated PE 2 | 118.8 | 10.34 |
| Inv. Ex. 12 | POD3 coated PE 2 | 126.8 | 9.21 |
| Inv. Ex. 13 | POD4 coated PE 2 | 128.2 | 9.6 |
| Inv. Ex. 14 | POD5 coated PE 2 | 128 | 8.84 |

TABLE VIII

| Example No. | Material Description | Gloss at 60° | Haze (total) |
|---|---|---|---|
| Comp. Ex. E | Neat PE 3 | 79.14 | 40.78 |
| Comp. Ex. F | Polyurethane coated PE 3 | 124.2 | 17.3 |
| Inv. Ex. 15 | POD1 coated PE 3 | 92.46 | 18.08 |
| Inv. Ex. 16 | POD2 coated PE 3 | 108.2 | 17.92 |

TABLE VIII-continued

| Example No. | Material Description | Gloss at 60° | Haze (total) |
|---|---|---|---|
| Inv. Ex. 17 | POD3 coated PE 3 | 113.8 | 17.52 |
| Inv. Ex. 18 | POD4 coated PE 3 | 110.8 | 16.7 |
| Inv. Ex. 19 | POD5 coated PE 3 | 116.6 | 16.62 |

It will be apparent that modifications and variations are possible without departing from the scope of the present invention defined in the appended claims. More specifically, although some aspects of the present invention are identified herein as preferred or particularly advantageous, it is contemplated that the present invention is not necessarily limited to these aspects.

It will be apparent with the claims that use of the singular also includes the possibility of the plural. For example, reference to a coating layer also implicitly includes reference to at least one coating layer.

It is noted that one or more of the following claims utilize the term "wherein" as a transitional phrase. For the purposes of defining the present invention, it is noted that the term "wherein" is introduced in the claims as an open-ended transitional phrase that is used to introduce a recitation of a series of characteristics of the structure and should be interpreted in like manner as the more commonly used open-ended preamble term "comprising."

What is claimed is:

1. A coated film having improved optical properties and increased recyclability properties comprising a combination of:

(a) an all-polyethylene multilayer film; and (b) at least one coating layer;

wherein the coated film has a gloss at 60° of at least 85 units;

wherein the coated film has a haze of 30 percent lower than a non-coated film; and wherein the at least one coating layer comprises an ethylene/(meth)acrylic acid copolymer and is disposed on at least a portion of the surface of one side of the all-polyethylene multilayer film.

2. The film of claim 1, wherein the at least one coating layer is made from a coating dispersion composition comprising:

(A) at least one polymeric dispersant comprising an ethylene/(meth)acrylic acid copolymer;

(B) at least one neutralizing agent compound having a boiling point of less than 140° C.;

(C) optionally, at least one polyolefin base resin having a melt index of greater than 1; and (D) optionally, at least one wax compound.

3. The film of claim 1, wherein the all-polyethylene multilayer film consists of a first layer coextruded to a second layer, the first layer comprising a first polyethylene having a density, and the second layer comprising a second polyethylene having a density that is less than the density of the first polyethylene.

4. The film of claim 3 wherein the first polyethylene has a density greater than 0.941 g/cc.

5. The film of claim 4 wherein the first layer has a thickness and the second layer has a thickness that is less than the thickness of the first layer.

6. The film of claim 2, wherein (B) the at least one neutralizing agent compound is an amine.

7. The film of claim 6, wherein (C) the at least one polyolefin is present and is an ethylene/octene copolymer.

8. The film of claim 7 wherein the coating layer is an outermost layer.

9. A coated film having improved optical properties and increased recyclability properties comprising a combination of:

(a) an all-polyethylene multilayer film consisting of a first layer coextruded to a second layer, the first layer comprising a first polyethylene having a density, and the second layer comprising a second polyethylene having a density less than the density of the first polyethylene; and (b) at least one coating layer comprising an ethylene/(meth)acrylic acid copolymer, the coating layer disposed on a surface of the first layer;

wherein the coated film has a gloss at 60° of at least 85 units; and a haze of 30 percent lower than a non-coated film.

10. The film of claim 9 wherein the first layer has a thickness and the second layer has a thickness that is less than the thickness of the first layer.

11. The film of claim 10, wherein the coating layer comprises an amine.

12. The film of claim 11, wherein the coating layer comprises an ethylene/octene copolymer.

13. The film of claim 11 wherein the coating layer is an outermost layer.

14. The film of claim 13 wherein the second layer is an outermost layer.

\*   \*   \*   \*   \*